United States Patent [19]

Fukuhara et al.

[11] 4,384,331
[45] May 17, 1983

[54] NOISE SUPPRESSOR FOR VEHICLE DIGITAL SYSTEM

[75] Inventors: Hiroshige Fukuhara; Yukitsugu Hirota; Masazumi Sone, all of Yokohama, Japan

[73] Assignee: Nissan Motor Company, Limited, Kanagawa, Japan

[21] Appl. No.: 141,979

[22] Filed: Apr. 21, 1980

[30] Foreign Application Priority Data

Apr. 23, 1979 [JP] Japan .................. 54-48991

[51] Int. Cl.³ .................. H04B 15/06; H01R 13/648
[52] U.S. Cl. .................. 364/431.12; 333/12; 339/143 R; 364/574
[58] Field of Search .............. 364/574, 431.11, 431.12; 333/12; 339/143 R

[56] References Cited

U.S. PATENT DOCUMENTS

| | | | |
|---|---|---|---|
| 3,660,787 | 5/1972 | Mahmoud et al. | 333/12 |
| 3,906,207 | 9/1975 | Rivere et al. | 364/425 |
| 4,029,386 | 6/1977 | Krantz et al. | 339/143 R |
| 4,104,600 | 8/1978 | Mayer | 333/12 |
| 4,105,007 | 8/1978 | Mochimaru | 333/12 |
| 4,126,370 | 11/1978 | Nijman | 339/143 R |
| 4,153,023 | 5/1979 | Asano et al. | 123/119 |
| 4,201,161 | 5/1980 | Sasayama et al. | 364/431 X |
| 4,209,829 | 6/1980 | Leichle | 364/431 X |
| 4,231,091 | 10/1980 | Motz | 364/431.04 |
| 4,236,213 | 11/1980 | Richardson | 364/431.04 |
| 4,255,789 | 3/1981 | Hartford et al. | 364/431 |

FOREIGN PATENT DOCUMENTS 2025158A  1/1980  United Kingdom ............ 339/143 R

OTHER PUBLICATIONS

Newark Electronics Catalog 70 p. 318 (1970), (Note 1980 Catalog p. 207 for diagram of connections).
Allied Electronics Catalog 1972 pp. 215, 216, General Motors: Computer Command Control (Picture of interest).
Ficchi: Electrical Interference (Textbook) Hayden Book Co. New York, 1964 pp. 48–61 of interest.
N. S. Publication: Voltage Regulators LM 100, 200, 300, p. 19, 1967 National Semiconductor Corp.
Sheingold: Analog Digital Conversion Handbook Published by Analog Devices, Jun. 1972, p. I-9 of interest.

Primary Examiner—Felix D. Gruber
Attorney, Agent, or Firm—Lowe, King, Price & Becker

[57] ABSTRACT

A noise suppressor is disclosed for an automotive vehicle control system including a digital computer and a power unit for supplying power to the digital computer. The noise suppressor comprises an inductor connected in series with a power line extending from the power unit and capacitors each connecting each of signal lines extending from the digital computer with ground. The inductor and capacitors are enclosed in a metal casing.

18 Claims, 12 Drawing Figures

NOISE SUPPRESSOR FOR VEHICLE DIGITAL SYSTEM

BACKGROUND OF THE INVENTION

1. Field of the Invention

This invention relates to a noise suppressor for use with an automotive vehicle control system including a digital computer using clock pulses for eliminating radio interference problems.

2. Description of the Prior Art

As inexpensive and high performance digital computers become available with advancing digital electronics technology, it becomes technically and economically desirable to use a digital computer to control an automotive vehicle internal combustion engine and other automotive vehicle components.

FIG. 1 is a block diagram of a prior art control system using a digital computer and FIGS. 2 and 3 are schematic views showing the location of an automotive digital computer.

Referring to FIG. 1, a digital computer 10 includes control units 11 to 14, a central processing unit (CPU) 15, and a memory 16. The control units 11 to 14 are respectively connected through input/output interfaces 21 to 24 to signal terminals 31 to 34, in turn connected to signal lines 41 to 44, respectively. The digital computer 10 is powered through a power unit 25, connected to a power terminal 35 and thence through a power line 45 to an external power source such as an automotive vehicle battery. The digital computer 10, the input/output interfaces 21 to 24 and the power unit 25 are enclosed by a metal casing 50.

As shown in FIG. 2, the metal casing 50 is installed below an automotive vehicle instrument panel or below a seat for the driver, at a location where temperature, moisture and other environment conditions are not particularly adverse. A bundle 40, beneath the vehicle hood, includes signal lines 41 to 44 and the power line 45.

In such a digital computer, relatively high voltages (several volts) rectangular clock pulses are used as computer control synchronizing pulses having fundamental, harmonic and higher harmonic frequencies over a wide range of radio frequency bands, including AM, FM and TV bands; the pulses cause radio interference. Since the signals normally fed through the signal lines 41 to 44 from various sensors and to the fuel injection valve drive coils are low frequency signals, signal lines 41 to 44 are commonly made of polyvinyl chloride tubes covering electric wires; lines 41 to 44 are wired in a bundle as are other electric wires connected to a radio receiver and other communication devices. All of the lines and wires are located in the bundle without any consideration of the possibility of leakage of high frequency signals through the signal lines. If rectangular clock pulses leak through the signal lines 41 to 44 due to electromagnetic coupling between the CPU 15 and the input/output interfaces 21 to 24, the clock pulses are coupled directly or indirectly to the other electric wires, causing radio interference. Electromagnetic coupling of noises radiating from the bundle of the signal lines 40 to an automotive vehicle receiver system including antenna 61 having thin conductors embedded in the vehicle front glass windshield, radio receiver 62, and an electric wire 63 leading to the radio receiver 62 is schematically shown in FIG. 3 by arrows.

In such a digital computer contained control system, many difficulties have been found in attempting to prevent leakage of rectangular clock pulses through the signal lines.

A first difficulty is that a relatively large number of design processes are required to determine a suitable layout to completely, electromagnetically separate parts, such as the CPU 15, memory 16 and the like, that operates with rectangular clock pulses, from the other parts, such as the input/output interfaces 21 to 24 and the signal lines 41 to 44.

The electromagnetic coupling between the signal lines and the other electric wires may be avoided by: (1) using a shielding cable such as a concentric cable as the signal lines, (2) shielding the signal lines from the other electric wires, or (3) spacing the signal lines from the other electric wires and the antenna as far as possible. These three techniques are impossible in practice if a great number of signal lines are provided, the wiring is complex, or the electric wires terminate at many points within the vehicle compartment.

If the digital system is placed adjacent the communication devices and rectangular clock pulses leak to the input/output signal lines, the signal-to-noise (S/N) ratio of the communication devices is reduced due to electromagnetic coupling between the signal lines and the electric wires leading to the communication devices and antenna; the ratio is further reduced due to beat interference.

SUMMARY OF THE INVENTION

It is therefore one object of the present invention to eliminate the above described disadvantages found in conventional automotive vehicle control systems including a digital computer.

Another object of the present invention is to provide an automotive noise suppressor which prevents leakage of rectangular clock pulses tending to cause radio interference.

BRIEF DESCRIPTION OF THE DRAWINGS

The present invention is described in greater detail by reference to the following description taken in connection with the accompanying drawings, in which.

DESCRIPTION OF THE PREFERRED EMBODIMENTS

Figure 1:
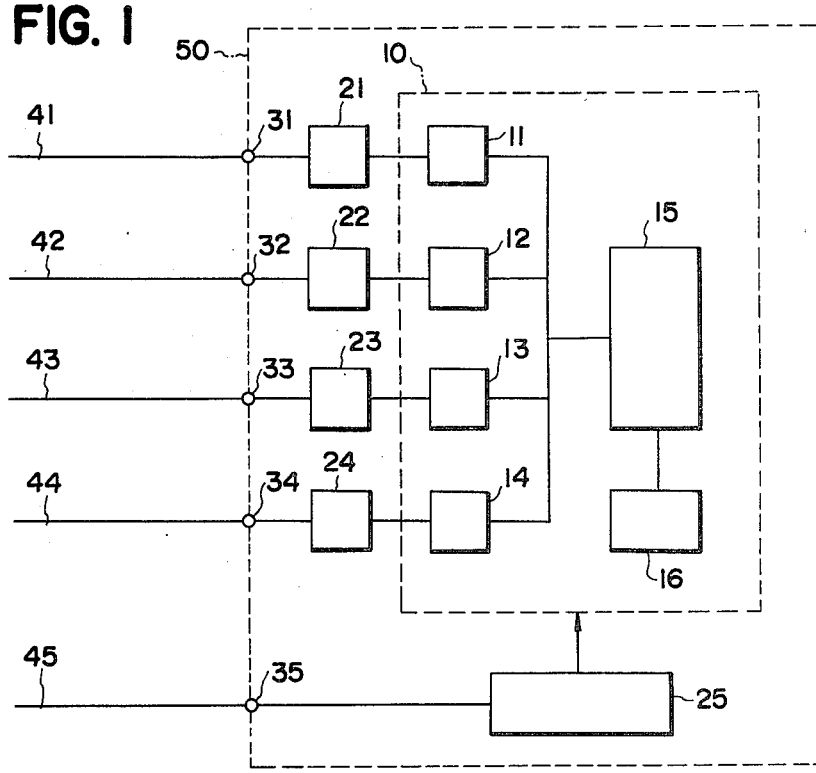
FIG. 1 is a block diagram of a conventional control system using a digital computer.
Figure 2:
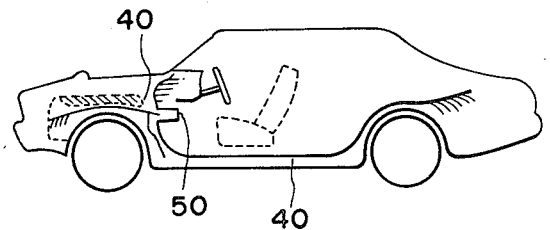
FIGS. 2 and 3 are schematic views showing the location of the digital computer of FIG. 1.
Figure 3:
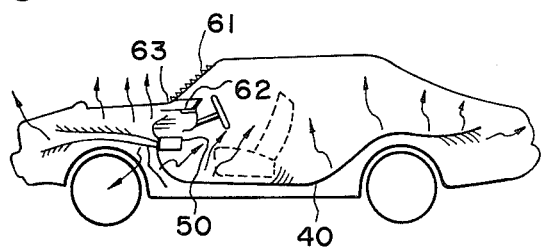
Figure 4:
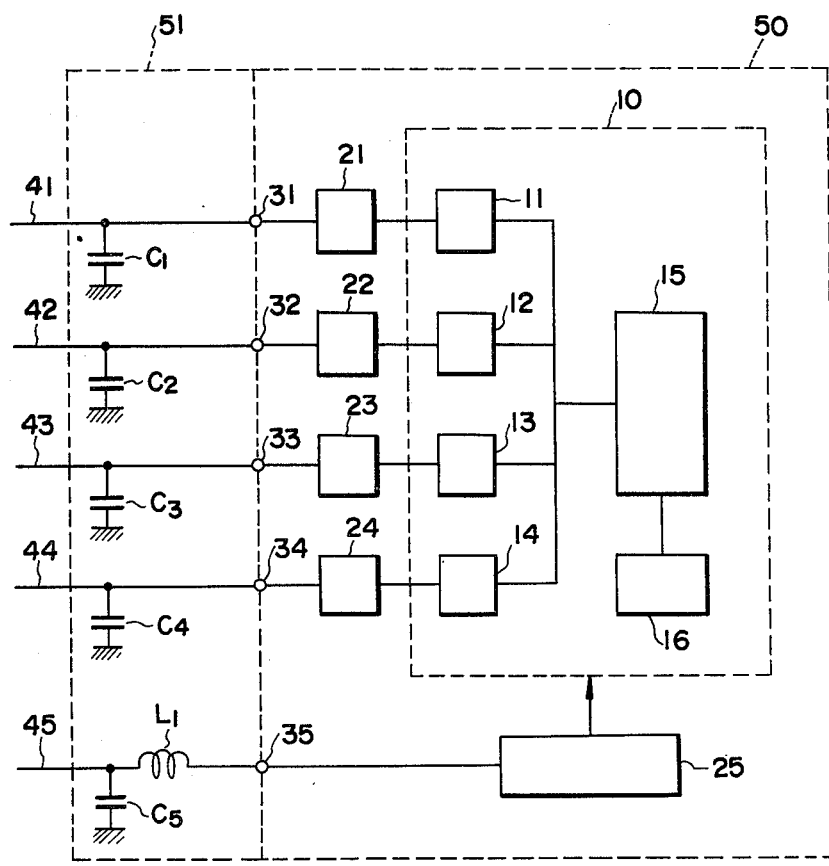
FIG. 4 is a block diagram of one embodiment of a noise suppressor in accordance with the present invention.

FIG. 4 is a block diagram of one embodiment of a noise suppressor in accordance with the present invention.

Referring to FIG. 4, an inductor $L_1$ is connected in series between the power terminal 35 and the power line 45, while capacitors $C_1$ to $C_4$ are connected in shunt between respective signal lines 41 to 44 and ground, and capacitor $C_5$ is connected in shunt between power line 45 and ground. The inductor $L_1$ and the capacitors $C_1$ to $C_5$ are enclosed by a metal casing 51 attached to the metal casing 50. Metal casing 51 may be eliminated if inductor $L_1$ and the capacitors $C_1$ to $C_5$ are placed within the metal casing 50. Metal casing 51 may be separated from the metal casing 50, in which case the casings should be electrically connected to each other to maintain them at the same ground potential.

Figure 5A:
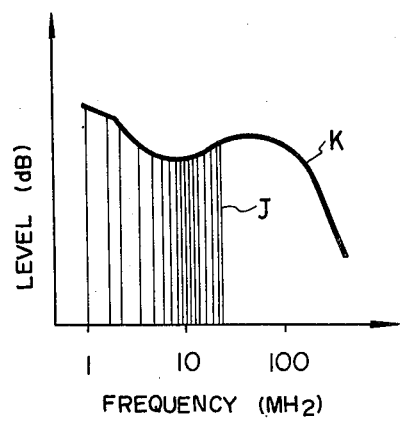
FIGS. 5A to 5C are high frequency current spectrum distribution diagrams helpful in describing the noise suppressing effect of the present invention.
Figure 5B:
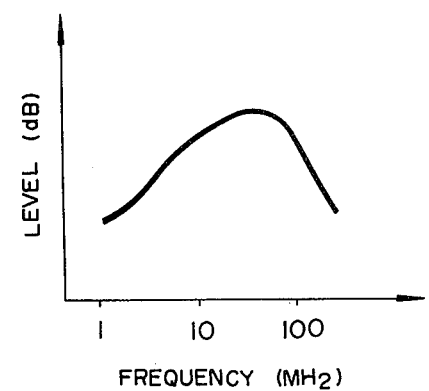
Figure 5C:
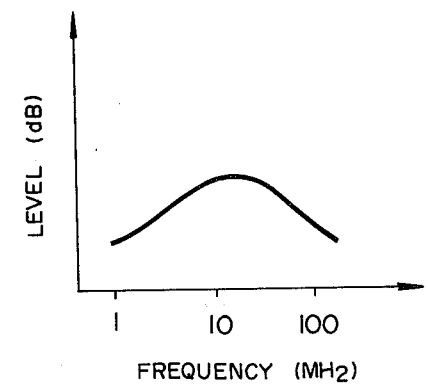

FIG. 5A is a diagram of the spectrum distribution of high frequency currents on the signal lines 41 to 44 and the power line 45 with the inductor $L_1$ and capacitors $C_1$ to $C_5$ eliminated. In FIG. 5A, the fundamental and higher harmonic spectrum J are within envelope K. FIG. 5B is a high frequency current spectrum distribution diagram of an envelope that exists if only a 100 $\mu$H inductor $L_1$ is connected in series with the power line 45; FIG. 5C is a high frequency current spectrum distribution diagram of our envelope that exists if a 100 $\mu$H inductor $L_1$ is connected in series with the power line 45 and 1,000 PF capacitors $C_1$ to $C_5$ are connected in shunt, as shown in FIG. 4.

With a prior art arrangement where the inductor $L_1$ and the capacitors $C_1$ to $C_5$ are eliminated that causes the spectrum of FIG. 5A to be provided, the high frequency current spectrum is distributed over a wide range of radio frequency bands including AM, FM and TV bands; this distribution causes radio interference in these bands. By connecting a 100 $\mu$H inductor in series with the power line, a great noise suppressing effect appears in the low frequency side near the AM band as seen in FIG. 5B. By connecting a 100 $\mu$H inductor in series with the power line 45 and 1,000 PR in shunt between the respective signal lines and ground, a great noise suppressing effect is obtained over the full range of frequency bands as seen in FIG. 5C. The capacitors provide a great noise suppressing effect in the high frequency side in the FM and TV bands.

It has been found through our experiments that the spectrum distribution is dependent in the AM band upon the signals on the signal lines 41–44 and in the FM and TV bands upon the signal on the power line 45. Thus, there is no need for any inductor to be connected in series with the signal lines 41–44. It has been proven that a great noise suppressing effect is obtained only where a shunt capacitor is connected to each of the signal terminals 31–34 on which the rectangular clock pulses leak. If a greater noise suppressing effect is desired, a $\pi$-filter composed of a series inductor connected between a pair of shunt capacitors may be provided for each of the signal terminals. However, it has been proven that a satisfactory noise suppressing effect can be obtained by providing an inductor for the power terminal and a capacitor for each of the signal terminals.

The metal casing 51 prevents leakage of high frequency waves and improves the noise suppressing effect of the inductor and capacitors. It is most preferable to place the inductor $L_1$ and capacitors $C_1$–$C_2$ in a location within the metal casing 50 enclosing the digital computer 10 and nearest the points from which the signal lines extend to the exterior of the metal casing 50.

Figure 6:
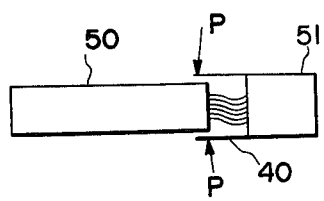
FIGS. 6 to 10 are schematic views of various modifications of the noise suppressor of the present invention.

FIG. 6 is an illustration of a modification of the noise suppressor of the present invention where the metal casing 51 enclosing the inductor $L_1$ and capacitors $C_1$ to $C_5$ is spaced from the metal casing 50 enclosing the digital computer 10. In this case, the metal casings 50 and 51 are attached at a plurality of points P to each other, such as by welding or using screws or rivets, so as to maintain the casings at the same ground potential.

In FIG. 6, a bundle of signal and power lines 40 extends between casings 50 and 51.

Figure 7:
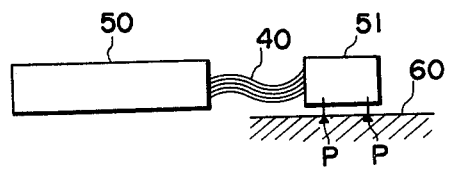

FIG. 7 is an illustration of another modification of the present invention where the metal casing 51 enclosing the inductor $L_1$ and capacitors $C_1$ to $C_5$ is spaced from the metal casing 50 enclosing the digital computer 10. In this case, the metal casing 51 is secured at a plurality of points P to the vehicle body 60; casing $S_1$ is secured to body 60 by screws or the like so as to maintain the metal casings 50 and 51 at the same ground potential.

Figure 8:
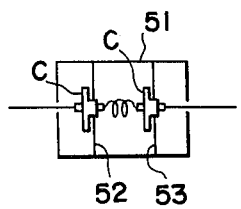

FIG. 8 is an illustation of still another modification of the present invention in which two metal partitions 52 and 53 are provided within the metal casing 51. Each of the partitions supports a through type capacitor C for each of the signal lines 41 to 44. The partitions 52 and 53 are effective to prevent leakage of high frequency waves. The number of partitions may be reduced to one.

Figure 9:
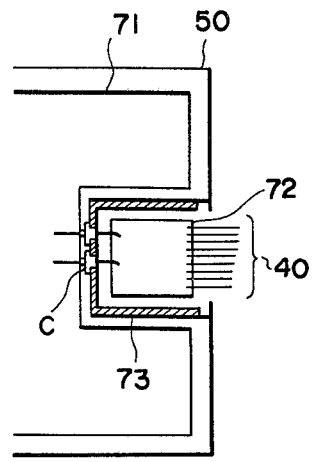

FIG. 9 is an illustration of another modification of the present invention in which the digital computer 10, the control units 21 to 24, and the power unit 25 are located on a first substrate 71, while the signal and power terminals 31 to 35, the inductor $L_1$ and the capacitor $C_1$ to $C_5$ are located on a second substrate 72. The first and second substrates 71 and 72 are enclosed by the metal casing 50 and spaced from each other by a metal shield plate 73, electrically connected to the metal casing 50. The metal plate 73 supports through type capacitors C through which the control units 11 to 14 are connected to the respective signal terminals 31 to 34. In FIG. 9, a bundle 40 of the signal and power lines is provided. This arrangement is effective to provide a greater noise suppressing effect.

Figure 10:
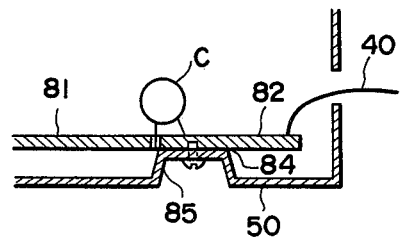

FIG. 10 is an illustration of another modification of the present invention in which the components are placed on a substrate 81 having an upper surface formed with a signal line pattern 82 connected to the signal lines 83 and a lower or rear surface formed with a ground pattern 84 attached to an inwardly projected portion 85 of the metal casing 50 by screws or the like. The capacitors C are connected between the signal line patterns 82 and ground pattern 84. This arrangement is effective to improve the bypass effect of the capacitors C.

The inductance of the inductor $L_1$ used in the present invention is in no way limited to 100 $\mu$H and may be in the range between 10 $\mu$H and 100 mH. The capacitance of the capacitor $C_1$ to $C_5$ is not limited to 1,000 PF and may be in the range between 100 PF to 1 $\mu$F.

The present invention provides an inductor connected is series with the power line and capacitors connected in shunt between the respective signal and power lines and ground. The inductor and the capacitors are enclosed in a metal casing. This arrangement has been proven effective to prevent leakage of rectangular clock pulses to the signal and power lines and to prevent the occurrence of radio interference. The capacitors and inductor may be enclosed in a metal casing separate from the metal casing enclosing the digital computer. Thus, the noise suppressor can readily be used in an automotive vehicle with any existing control systems using a digital computer.

While the present invention has been described in connection with specific embodiments thereof, it is evident that many alternatives, modifications and variations will be apparent to those skilled in the art. Accordingly, it is intended to embrace all alternatives, modifications and variations that fall within the spirit and broad scope of the appended claims.

What is claimed is:

1. A noise suppressor for use with an automotive vehicle control system including a power unit connected through a power line to a power source, and a digital computer powered by said power unit and operable in synchronism with clock pulses, said digital computer connected to signal lines through which vehicle running condition indicative signals are fed thereto and control signals are fed therefrom, the suppressor comprising: a plurality of capacitors, each connected in shunt between each of selected ones of said signal lines and ground; an inductor connected in series with said power line; a capacitor connected in shunt between said power line and ground; and means for shielding said digital computer, thereby minimizing transmission of high frequency signals caused by the clock pulses through said signal and power lines.

2. The noise suppressor of claim 1 wherein each of said capacitors has a capacity value ranging between 100 PF and 1,000 PF and the inductor has an inductance value ranging between 1μ and 100 mH.

3. The noise suppressor of claim 1 wherein said shielding means comprises a grounded metal casing enclosing said digital computer, said power unit, said inductor and said capacitors.

4. The noise suppressor of claim 3 further including a metal plate enclosed by said metal casing, said capacitors being through type capacitors fitted in through-holes formed in the plate.

5. The noise suppressor of claim 1 wherein said shielding means comprises: a first grounded metal casing enclosing said digital computer and said power unit, and a second metal casing enclosing said inductor and said capacitors, said second metal casing electrically connected to said first metal casing.

6. The noise suppressor of claim 5 further including a metal plate enclosed by said second metal casing, said capacitors being through type capacitors fitted in through-holes formed in the plate.

7. Apparatus for substantially preventing electronic noise from being coupled to communication components of an automotive vehicle from a digital control system of the automotive vehicle, the control system being energized by a power unit connected by a power line to be responsive to a DC power source of the vehicle, said power unit being connected to a supply terminal of a digital computer by a supply lead, said digital control system being connected to unshielded leads carrying signals indicative of conditions of the vehicle, said computer deriving pulses, the pulses having a tendency to be coupled from said digital control system to the leads to have a tendency to establish electronic noise that interferes with the communication components, the apparatus comprising grounded metal shield means encasing the digital computer, power unit and supply lead for shielding the communication components from the computer, power unit and supply lead, the power line and signal carrying leads extending through the metallic shield, a shunt capacitor connected between the power line and ground, a separate shunt capacitor connected between each of the signal carrying leads and ground, an inductor series connected with the power line, the capacitors and inductor having values to attenuate the electronic noise to a level that does not substantially interfere with the communication components and being located within the shield means.

8. The apparatus of claim 7 wherein the metal shield means includes first and second separate metal containers in which are respectively located (1) the computer, power unit and supply lead and (2), the capacitors and inductor; and means for electrically connecting said containers to each other so each is grounded, a bundle including the power and signal wires extending through walls of the containers.

9. The apparatus of claim 8 wherein the first and second containers respectively include first and second substrates, a metal plate located between the substrates, said plate being carried by one of the containers and including through holes, said capacitors being carried by said plate and being fitted to extend through the holes, said capacitors having opposite electrodes connected to leads on the substrate.

10. The apparatus of claim 8 wherein the second container includes a substrate having opposite first and second faces respectively carrying signal line and ground patterns, the ground patterns being in abutting mechanical and electrical relation with the one container, the signal line patterns being mechanically and electrically spaced from the containers, one of said capacitors having first and second leads respectively electrically and mechanically connected to the ground and signal line patterns, the first lead extending through a hole in the substrate, the capacitor having a body proximate the first face and remote from the second face.

11. The apparatus of claim 8 wherein the second container includes an interior metal partition having edges electrically and mechanically abutting against metal exterior wall means of the second container, said partition having an aperture through which one of said capacitor fits.

12. In combination with an automotive vehicle, radio frequency communication components, a digital control system including a digital computer, sensors for deriving input signals for the digital control system, the digital control system deriving pulses, unshielded leads connected to have a tendency to carry the pulses from the control system to the sensors and to carry the input signals from the sensors to the control system, the pulses carried by the unshielded leads from the control system to the sensors having a tendency to establish radio frequency interference that interferes with the communication components, apparatus for substantially preventing the radio frequency interference from being coupled to the communication components, including: grounded metal shield means encasing the digital control system for electromagnetically shielding the communication components from the control system, the leads extending through the metal shield means, a separate shunt capacitor connected between each lead and ground, each shunt capacitor being encased within the shield means, the capacitors having values to attenuate the radio interference to a level such that the interference does not substantially interfer with the communication components so the radio interference is confined to the interior of the shield means.

13. The combination of claim 12 further including a bundle in which are located the unshielded leads between the sensors and shield means, lead wires for the communication components also being located in said bundle, the lead wires and unshielded leads in the bundle being electromagnetically coupled.

14. The combination of claim 12 or 13 further including a DC power unit for the digital control system, a first power lead connected between the power unit and the digital control system, a second power lead connected between a DC power supply of the vehicle and the power unit, a series inductor in the second power lead, a shunt filter capacitor connected between ground and a common connection for one terminal of the inductor and an ungrounded terminal of the DC vehicle power supply, the second power lead having a tendency to carry radio frequency interference tending to interfer with the radio frequency communication components, the series inductor and shunt filter capacitor having values to reduce the radio frequency interference on the second power lead so it does not interfer substantially with the radio frequency communication components, said power unit, first power lead, series inductor, shunt filter capacitor and the second power lead between a second terminal of the inductor and the power unit being encased in the shield means.

15. The combination of claim 14 wherein the shield means includes first and second separate metal containers in which are respectively located (1) the DC power unit, digital control system and first power lead, and (2), the capacitors and inductor; and means for electrically connecting said containers to each other so each is grounded, a bundle including the power and signal wires extending through walls of the containers.

16. The combination of claim 14 wherein the shield means includes first and second separate metal containers in which are respectively located (1) the DC power unit, digital control system and first power lead, and (2), the capacitors and inductor; and means for electrically connecting said containers to each other so each is grounded, a bundle including the power and signal wires extending through walls of the containers, the first and second containers respectively including first and second substrates, a metal plate located between the substrates, said plate being carried by one of the containers and including through holes, said capacitors being carried by said plate and being fitted to extend through the holes, said capacitors having opposite electrodes connected to leads on the substrate.

17. The combination of claim 14 wherein the shield means includes first and second separate metal containers in which are respectively located (1) the DC power unit, digital control system and first power lead, and (2), the capacitors and inductor; and means for electrically connecting said containers to each other so each is grounded, a bundle including the power and signal wires extending through walls of the containers, the second container including a substrate having opposite first and second faces respectively carrying signal line and ground patterns, the ground patterns being in abutting mechanical and electrical relation with the one container, the signal line patterns being mechanically and electrically spaced from the containers, one of said capacitors having first and second leads respectively electrically and mechanically connected to the ground and signal line patterns, the first lead extending through a hole in the substrate, the capacitor having a body proximate the first face and remote from the second face.

18. The combination of claim 14 wherein the shield means includes first and second separate metal containers in which are respectively located (1) the DC power unit, digital control system and first power lead, and (2), the capacitors and inductor; and means for electrically connecting said containers to each other so each is grounded, a bundle including the power and signal wires extending through walls of the container, the second container including an interior metal partition having edges electrically and mechanically abutting against metal exterior wall means of the second container, said partition having an aperture through which one of said capacitors fits.

* * * * *